United States Patent
MacPherson et al.

(10) Patent No.: US 9,738,105 B2
(45) Date of Patent: *Aug. 22, 2017

(54) OPTICALLY VARIABLE DEVICES, THEIR PRODUCTION AND USE

(75) Inventors: Charles Douglas MacPherson, Santa Barbara, CA (US); Bruce Alfred Hardwick, Wandong (AU)

(73) Assignee: Nanotech Security Corp., Burnaby, BC (CA)

( * ) Notice: Subject to any disclaimer, the term of this patent is extended or adjusted under 35 U.S.C. 154(b) by 876 days.

This patent is subject to a terminal disclaimer.

(21) Appl. No.: 13/642,476

(22) PCT Filed: Apr. 21, 2011

(86) PCT No.: PCT/CA2011/000460
§ 371 (c)(1),
(2), (4) Date: May 1, 2013

(87) PCT Pub. No.: WO2011/130842
PCT Pub. Date: Oct. 27, 2011

(65) Prior Publication Data
US 2013/0207374 A1    Aug. 15, 2013

Related U.S. Application Data

(60) Provisional application No. 61/326,364, filed on Apr. 21, 2010.

(51) Int. Cl.
*B42D 15/00* (2006.01)
*B42D 25/29* (2014.01)
(Continued)

(52) U.S. Cl.
CPC ............. *B42D 15/00* (2013.01); *B42D 25/29* (2014.10); *B42D 25/425* (2014.10); *G02B 5/28* (2013.01);
(Continued)

(58) Field of Classification Search
CPC .......... G02B 5/28; G02B 5/286; G02B 5/287; G02B 5/288; G02B 26/001;
(Continued)

(56) References Cited

U.S. PATENT DOCUMENTS 7,224,528 B2 *   5/2007   Phillips et al. ............... 359/584
8,927,072 B2 *   1/2015   Whiteman ...................... 428/29
(Continued)

FOREIGN PATENT DOCUMENTS

CA          2 656 506 A1       8/2010
DE     10 2008 0131 67         9/2009
(Continued)

OTHER PUBLICATIONS

International Search Report and Written Opinion for PCT/CA2011/000460, Aug. 10, 2011, consists of 8 pages.
(Continued)

*Primary Examiner* — Scott J Sugarman
*Assistant Examiner* — Ibrahima Diedhiou

(57) ABSTRACT

Security documents often incorporate optically variable devices to prevent or hinder counterfeiters. Disclosed herein are layered optically variable devices such as color-shift foils, and methods for their production and use. Such devices afford new techniques for a user of a security document to check quickly and easily whether the security document is a legitimate document or a counterfeit copy.

26 Claims, 8 Drawing Sheets

(51) Int. Cl.
*B42D 25/425* (2014.01)
*B42D 25/373* (2014.01)
*G02B 5/28* (2006.01)

(52) U.S. Cl.
CPC .............. *G02B 5/286* (2013.01); *G02B 5/288* (2013.01); *B42D 25/373* (2014.10); *B42D 2033/10* (2013.01); *B42D 2033/12* (2013.01); *B42D 2033/18* (2013.01); *B42D 2033/32* (2013.01); *B42D 2035/24* (2013.01); *B42D 2035/26* (2013.01); *B42D 2035/36* (2013.01); *G02B 5/287* (2013.01)

(58) Field of Classification Search
CPC ........ G02B 26/29358; G02B 26/29361; G02B 5/285; B42D 15/00; B42D 15/0033; B42D 2033/06; B42D 2033/10; B42D 2033/12; B42D 2033/14; B42D 2033/18; B42D 2033/28; B42D 2033/30; B42D 2033/32; B42D 2035/24; B42D 25/00; B42D 25/29; B42D 25/30; B42D 25/328; B42D 25/351; B42D 25/355; B42D 25/41; B42D 25/44; B42D 25/45–25/47; B42D 25/425; B42D 2033/00; B42D 2035/20; B42D 2035/26; B42D 2035/28; B42D 2035/30; B42D 2035/36; B44F 1/10; B41M 3/148; G02F 2202/32; G02F 1/19; G02F 1/21; G02F 1/216; G02F 1/133514; Y10T 428/24917; Y10T 428/2447; G03H 2250/10; G03H 2250/33–2250/35; G03H 2250/40; G03H 2250/42; G01B 2290/25; G01J 3/26; G01J 3/51; G01J 2003/1226; B82Y 20/00

USPC ............ 359/85, 579, 260, 2, 290, 577–578, 359/584–585; 283/67, 70, 72, 74, 85, 94, 283/57–59, 901–902, 904; 156/273.3, 156/277, 163, 181; 356/450, 454, 506; 349/106

See application file for complete search history.

(56) References Cited

U.S. PATENT DOCUMENTS

| 2004/0101676 | A1* | 5/2004 | Phillips .................. B32B 27/36 |
| | | | 428/323 |
| 2007/0292636 | A1 | 12/2007 | Phillips et al. |
| 2008/0075668 | A1 | 3/2008 | Goldstein |
| 2009/0105605 | A1* | 4/2009 | Abreu .................. A61B 5/0008 |
| | | | 600/549 |
| 2010/0045027 | A1 | 2/2010 | Whiteman |

FOREIGN PATENT DOCUMENTS

| FR | 2 698 390 | 5/1994 |
| WO | WO 2010057307 A1 * | 5/2010 |

OTHER PUBLICATIONS

Phillips, R. W., et al., "Optical Coatings for Document Security," Applied Optics, Oct. 1, 1996, pp. 5529-5534, vol. 35, No. 28.
Supplementary European Search Report for European Patent Application 11771447.7, dated Sep. 13, 2013, consists of 7 unnumbered pages.

* cited by examiner

OPTICALLY VARIABLE DEVICES, THEIR PRODUCTION AND USE

FIELD OF THE INVENTION

The invention relates to optically variable devices, as well as methods for their production and use. Such optically variable devices may, for example, be incorporated into security documents of value, including documents which may be subject to counterfeiting, such as passports, banknotes and other articles.

BACKGROUND TO THE INVENTION

Bank notes and other security documents often incorporate optically variable devices (OVDs) such as diffraction gratings or holographic optical microstructures as security features against copy and counterfeit. The increased use of such devices has been motivated by progress in the fields of computer-based desktop publishing and scanning, which render conventional security print technologies, such as intaglio and offset printing, increasingly susceptible to counterfeit. One way to strengthen security documents against counterfeit is to combine security print with optically variable devices whose structures cannot be replicated by scanners, and which can exhibit optically variable effects such as colour changes by diffraction, movement effects, and distinct switches between images.

For example, holograms are widely used as security features in credit cards as they cannot be reproduced by photographic or photocopying techniques. To enhance the security of holograms and to prevent contact copies being made, a technique was developed for making holograms by a process of demetalization. Demetalized holograms and patches are often used in passports and ID cards to protect photographs and data. The image beneath the hologram is only visible when the document is tilted. Other OVDs include polymer or laminate microstructures in the form of foils that exhibit colour shifts in transmitted light passing through the foil and/or ambient light reflecting from the foil. Tilting the foil results in a visible colour-shift effect due for example to a laminate microstructure, or Bragg stacking within the foil. Such devices provide particularly useful surface security features in applications where the substrate to which they are applied is flexible or foldable, such as in banknotes.

Security devices, including those comprising OVDs, often take the form or shape of strips or threads. Such threads are traditionally made from a transparent film provided with a continuous reflective metal layer, vacuum deposited aluminium on polyester film being the commonest example. Banknotes incorporating such security devices have been in general circulation in many countries for many years. When such security elements are fully embedded in security paper, and the paper is subsequently printed to provide the security document (e.g. a banknote), the thread cannot be discerned readily in reflected light but is immediately apparent as a dark image when the document is viewed in transmitted light. Such threads are effective against counterfeiting by printing or photocopying, since the optically variable effect cannot be simulated accurately, for example by printing a line on the paper.

Security threads may also be incorporated into security documents in a manner such that they are conspicuous in reflected light, due to portions or the entirely of the security thread being exposed for visual inspection. For example, security threads may be woven into the principle substrate or material of the security document so that the thread is visible in repeating windows in the document, or alternatively the thread may be adhered or laminated to the principle substrate or material. When such security threads, or portions thereof, are exposed in reflected light, they may include or consist of optically variable features as previously described.

Also known in the art is the use of polymer-based films or sheets as an alternative basic substrate for the production of security documents. In some countries such films are used instead of paper-based substrates for bank note production. In comparison to bank notes manufactured using paper substrates, those made from polymer film are highly resilient to tearing, wear and abrasion. As such the bank notes have a longer useable lifespan, and thus may remain in circulation for a significant period of time. However, the use of polymer films presents new challenges with regard to incorporation of security features. For example, compared to paper, it is more difficult to embed or weave security features into polymer film bank notes. Instead, most security devices must be manufactured independently and adhered to the polymer film material. For example, colour-shifting threads and foils manufactured by vacuum deposition are expensive to manufacture and in the case of foils their application to a substrate may result in significant wastage of unwanted or unused thin film colour-shift material. In the case of threads, the expensive manufacturing process often limits the thread width that can embedded into the security document. Also adding content to optical thin film colour-shift material can be difficult and require multiple processing steps with caustic chemicals, or foil transfer techniques which can again result in significant wastage of the expensive material. As a result, large scale implantation of OVDs, for example in bank note production is expensive.

Thus there is a continuing need for improved security devices and features for security documents, as well as improved methods for their manufacture. In particular, the need extends to devices that are difficult to counterfeit, yet relatively inexpensive to manufacture, which are suitable for application to a range of substrate materials including both paper and polymer films.

SUMMARY OF THE INVENTION

It is an object of the invention, at least in selected embodiments, to provide an optically variable security device.

It is another object of the invention, at least in selected embodiments, to provide a method to check whether a security document is a legitimate or counterfeit security document.

Certain exemplary embodiments provide an optically variable device comprising:

a reflector layer;

an deformable spacer layer covering part or all of the reflector layer, said deformable spacer layer deformable from a relaxed state to a compressed state upon application of, or an increase of, mechanical pressure upon the layer; and an absorber layer covering the deformable spacer layer, where present, so that the deformable spacer layer spaces the absorber layer from the reflector layer to form an optical interference structure in at least one of said relaxed and compressed states.

Certain other exemplary embodiments provide for a use of an optically variable device as described herein, as a security feature of a security document.

Certain other exemplary embodiments provide for a security document comprising:
  a core material; and
  at least one optically variable device as described herein affixed to at least one side of the core material, or at least partially embedded into the core material, such that the device is at least partly visible in reflected light from said at least one side.

Certain other exemplary embodiments provide for a method for producing an optically variable device, the method comprising the steps of:
  providing a reflector layer;
  printing a deformable spacer layer upon preselected portions of the reflector layer, wherein said deformable spacer layer comprises an adhesive material; and
  contacting the deformable spacer layer with absorber material coated on a web, to cause release of the absorber material from the web and adhesion of the absorber material to the deformable spacer layer where present, thereby to complete an optical interference structure over said preselected portions of the reflector layer.

Certain other exemplary embodiments provide a method for checking whether a security document is a legitimate or counterfeit document, the security document comprising at least one optically variable device as described herein visible on at least one side thereof, the method comprising the steps of:
  applying mechanical pressure to at least one optically variable device; and
  observing whether the mechanical pressure causes a visible change in the appearance of the optically variable device, wherein any visible change is indicative that the security document is a legitimate document.

BRIEF DESCRIPTION OF THE DRAWINGS

FIG. 1a illustrates a top plan view of a security document incorporating an example security device.

FIG. 1b illustrates a cross-sectional view of a security document incorporating an example security device, taken along line A-A' in FIG. 1a.

FIG. 1c illustrates a cross-sectional view of a security document incorporating an example security device, taken along line A-A' in FIG. 1a, under mechanical pressure.

FIG. 2a illustrates a top plan view of a security document incorporating an example security device.

FIG. 2b illustrates a cross-sectional view of a security document incorporating an example security device, taken along line A-A' in FIG. 2a.

FIG. 2c illustrates a cross-sectional view of a security document incorporating an example security device, taken along line A-A' in FIG. 2a, under mechanical pressure.

FIG. 3a illustrates a top plan view of a security document incorporating an example security device.

FIG. 3b illustrates a cross-sectional view of a security document incorporating an example security device, taken along line A-A' in FIG. 3a.

FIG. 3c illustrates a cross-sectional view of a security document incorporating an example security device, taken along line A-A' in FIG. 3a, under mechanical pressure.

FIG. 4a illustrates a top plan view of a security document incorporating an example security device.

FIG. 4b illustrates a cross-sectional view of a security document incorporating an example security device, taken along line A-A' in FIG. 4a.

FIG. 5a illustrates a top plan view of a security document incorporating an example security device.

FIG. 5b illustrates a cross-sectional view of a security document incorporating an example security device, taken along line A-A' in FIG. 5a.

FIG. 6a illustrates a top plan view of a security document incorporating an example security device.

FIG. 6b illustrates a cross-sectional view of a security document incorporating an example security device, taken along line A-A' in FIG. 6a.

DEFINITIONS

Figure 1:
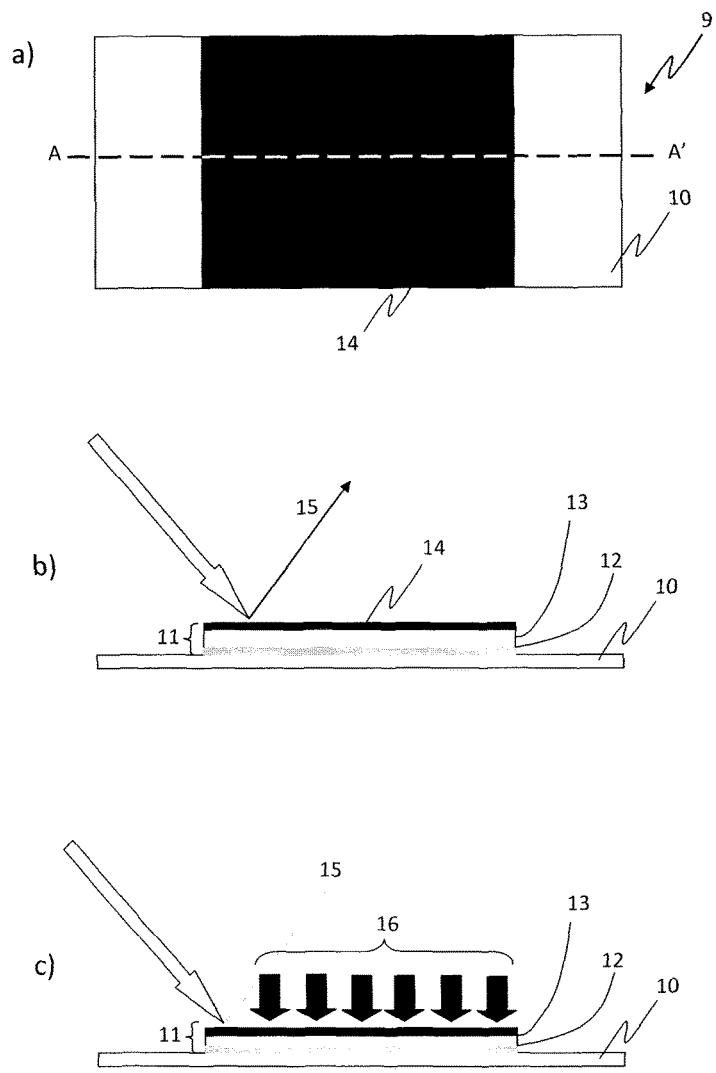

Absorber layer: refers to any layer forming part of any optically variable device of the invention, or any optical interference structure, that causes at least some (e.g. 1-99%) of light incident upon or reflected back to the layer to be transmitted through the layer, with at least a portion of the light absorbed by the layer. In other embodiments it refers to a thin metal layer which is part of a three layer Fabry-Perot reflection type interference filter and has the property of semi-transparency in a portion of the optical spectrum for which a colour-shift effect is desired. A description of the operation of the Fabry-Perot reflectance interface filter and the role of the absorber layer in such a structure may be found in reference (for example see Phillips, R. W. and Bleikom, "Optical Coatings for Document Security" Applied Optics, Vol. 35, No. 28, Oct. 1, 1996, pp. 529-5534.) In selected embodiments the absorber layer may be the surface layer of a security device comprising an optical interference structure. An absorber layer may comprise any material or combination of materials that exhibit the light absorption/transmission properties described, including but not limited to at least one material selected from the group consisting of: metals, metal alloys, Chromium alloys, Inconel, aluminum, or a material selected from the group consisting of chromium, nickel, palladium, titanium, vanadium, cobalt, iron, tungsten, molybdenum, niobium, ferric oxide, and combinations or alloys thereof. In selected embodiments the absorber layer may optimally permit about 50% of visible, UV or IR light incident thereupon to be transmitted through the absorber layer, with about 50% of light being absorbed by the absorber layer. In this way, more obvious colour-shift properties may be observed. For example, a layer of Inconel having a thickness of about 6 nm has been found to achieve such desired transmission/absorption and colour saturation characteristics.

Compressed state: refers to a state, shape or thickness of a deformable spacer layer upon application thereto of a mechanical force or pressure, or in the presence of an increased mechanical force or pressure, relative to a relaxed state, to compress or squash the layer such that the thickness of at least a portion of the layer is reduced. In selected embodiments a compressed state is a state that is different to a relaxed state in which the mechanical force or pressure is reduced or absent. However, a compressed state may be a single state in response to a fixed degree of force or pressure, or may pertain to a range of degrees of deformation in response to a range of degrees of mechanical force or pressure. Moreover, the amount of pressure or force required for a deformable spacer layer to adopt a compressed state may vary according to a degree of deformability of the layer. Optionally, the layer may form an optical interference structure in said compressed state or alternatively may form an optical interference structure following transition or relaxation from a compressed state to a relaxed state, or alternatively may form alternative optical interference structures according to whether the layer is in a compressed or relaxed state.

Core material: refers to any material used to form the main substrate, structure or sheet of a security document. The material is typically formed into a sheet or member, and may be composed of a substance selected from but not limited to paper, a plastic, a polymer, a resin, a fibrous material or the like, or combinations thereof. In selected embodiments the core material is of a material suitable for application thereto, either directly or indirectly, of a security device of the types disclosed herein. The security device, or elements thereof, may be applied or attached to the core material in any manner including the use of adhesive materials or layers, such as glues, or by overlaying an adhesive substance, film, varnish or other material over the top of the security device or components thereof. The core material may be smooth or textured, fibrous or of uniform consistency. Moreover, the core material may be rigid or substantially rigid, or flexible, bendable or foldable as require by the security document. The core material may be treated or modified in any way in the production of the final security document. For example, the core material may be printed on, coated, impregnated, or otherwise modified in any other way.

Colour: refers typically to a colour observed for visible or beyond visible (e.g. IR or UV) light emanating or reflecting from an optical interference structure or security device as disclosed herein. Any change that is observed in the colour, for example resulting from a change, formation or disruption of an optical interference structure, may result either in a change in the apparent colour observed from the structure or device at a fixed angle relative to a plane of the structure or device, and/or a change in the colour shift properties of the structure or device as it is tilted relative to a user. All such changes in optical properties are encompassed by the expression "colour-shift".

Deform/deformable: any reference to deformation encompasses any change in shape, configuration or thickness of a layer upon application to the layer or a part thereof of a mechanical force or pressure of any type from any implement (including a finger, plate, stylus, or any other item including another portion of a security document or device) by hand manipulation or any mechanical force generated by a machine or lever.

Deformable spacer layer: refers to any layer formed from any material that (1) can be temporarily deformed permanently or temporarily under mechanical pressure such that the thickness of the layer can be changed between a relaxed state absent mechanical pressure or under less mechanical pressure and a compressed state under increased mechanical pressure, and (2) has suitable optical properties such that when the layer separates a reflector layer and an absorber layer as described herein an optical interference structure is formed in at least one of the said relaxed and compressed states. Preferably the deformable spacer layer is reversibly deformable such that the layer can be transitioned between compressed and relaxed states multiple times upon repeated application and removal of the mechanical pressure, or repeated increase and decrease of mechanical pressure. The degree of deformability of the deformable spacer layer (in other words the capacity of the layer to be reduced in thickness upon application of mechanical pressure) may be established according to the material used to form the layer. Denser materials may be less inclined to deform compared to less dense materials under the same degree of mechanical pressure. Moreover, a deformable spacer layer may comprise a material comprising voids, pores or cavities preferably too small to be visible to the naked eye, but sufficient to provide space for the remainder of the material of the deformable spacer layer to press into when under mechanical pressure. Examples of materials suitable for use in the formation of deformable spacer layers include but are not limited to flexible materials such as natural rubbers, latexes, urathanes, polydimethylsiloxanes and its derivatives (such as Dow Corning's Sylgard 184 commonly used in as a deformable substrate for the technique of micro-contact printing). Furthermore, a deformable spacer layer may optionally comprise or consist of an adhesive material such as but not limited to: acrylated urethanes, methacrylate esters, mercapto-esters and UV curable materials. A deformable spacer layer may be applied under any conditions and in any way. In selected embodiments the layer is applied by printing such as by Gravure printing under atmospheric conditions.

Optical interference structure: refers to any structure that achieves interference of visible light incident upon the structure, such that light observed to be emanating from the structure appears different to the light incident upon the structure. For example, white light incident upon and reflected back from an optically variable foil may appear coloured, and the colour may change if the foil is tilted relative to the observer. An optical interference structure as described herein may also take the form of a planar optionally flexible device intended to form an independent layer or a layer on a substrate, or may take the form of a Flake or component of a Flake in accordance with such known devices in the art. Examples of optical intereference structures include, but are not limited to, those disclosed in Goodell et al., "Optical constants of Inconel alloy films", Journal of the Optical Society of America, 63(2), pages 185-188 and references cited therein, as well as Optical Document Security, Third Edition, Rudolf L. Van Renesse, Artech House 2005, Chapter 7 and references cited therein. Selected optical interference structures may comprise a multilayer structure or Fabry-Perot structure or other structure.

Polymer core material: refers to any polymer or polymer-like substance suitable to form a core material in the form of a sheet-like configuration to be formed or cut into a size suitable for use in security documents. The polymer core material may be a substantially uniform sheet of polymer material, or may take the form of a laminate structure with layers or polymer film adhered together for structural integrity, such as disclosed for example in international patent publication WO83/00659 published Mar. 3, 1983, which is incorporated herein by reference. A polymer core material may also comprise a material that includes a polymer in combination with other materials such as plastic or paper to form a hybrid core material.

Security document: refers to any document, item or article of manufacture of any importance or value, which might be subject to counterfeit copying. In selected embodiments, a security document may include features or devices intended to show that the document, item or article is a genuine and legitimate version, and not a counterfeit copy of such a document, item or article. For example, such security documents may include security features such as those disclosed herein. Such security documents may include, but are not limited to, identification documents such as passports, citizenship or residency documents, drivers' licenses, bank notes, cheques, credit cards, bank cards, and other documents, as well as labeling or other security features, for items of monetary value such as designer clothing, accessories, or any other branded products where it is desired to indicate or demonstrate the authenticity or legitimacy of the product compared to a counterfeit copy. Such security features may be permanently or removably incorporated therein depending upon the nature of the document, item or article, and the intended end user.

Security device or feature: refers to any device or feature that may be added to a security document for the purposes of making that security document more difficult to copy or replicate.

Reflector layer: refers to any layer forming part of any optically variable device of the invention, or any optical interference structure, that causes at least some (e.g. 1-100%) of light incident thereupon to be reflected. In selected embodiments the reflector layer may be in contact with a core material or substrate of a security document, to which a security device comprising the optically variable device is being applied. A reflector layer may comprise any reflective or partially reflective material including, but not limited to, at least one material selected from: a metal, a metal alloy, aluminum, chromium, nickel, Inconel silver, and gold.

Reflected light: refers to light incident upon a surface and subsequently bounced by that surface such that the reflected light is visible to the eye. The degree of light reflection may vary according to the surface, and the degree of light that is not reflected by the surface because it is scattered by, diffracted by, or transmitted through the surface and the material of the substrate.

Relaxed state: refers to a state, shape or thickness of a deformable spacer layer absent a mechanical force or pressure upon the layer, or in the presence of a reduced mechanical force or pressure relative to that applied to achieve a compressed state. In selected embodiments a relaxed state is any state that is different to a compressed state in which the mechanical force or pressure is present or increased relative to a relaxed state. However, a relaxed state may be a single state in response to a fixed degree of force or pressure (or no force or pressure), or may pertain to a range of degrees of deformation in response to a range of degrees of mechanical force or pressure. Moreover, the amount of pressure or force required for a deformable spacer layer to adopt a relaxed state may vary according to a degree of deformability of the layer. Optionally, the layer may form an optical interference structure in said relaxed state or alternatively may form an optical interference structure following transition from a relaxed state to a compressed state, or alternatively may form alternative optical interference structures according to whether the layer is in a compressed or relaxed state.

Security thread: refers to any elongate strip or thread applied directly or indirectly to, or incorporated into, a core material of a security document for the purposes of providing a security device or feature to the document, or for the purposes of providing a component of a security device or feature for the document. Security threads typically include a structure or materials suitable to make the security thread conspicuous in transmitted and/or reflected light. For example, a security thread may include a metal or metalized layer to make the security thread conspicuous in transmitted light. Alternatively, for example, a security thread may include an optically variable feature or device best observed in transmitted or reflected light. Traditionally, security threads are incorporated for example into bank notes comprising a paper core material or substrate, and the thread may be concealed from view in reflective light by the core material, or alternatively the thread may be partially visible as it emerges in windows in the core material, or by virtue of its threading into the core material. In accordance with the teachings herein, where the core material is a polymer core material, the security thread may also take the form of an elongate strip adhered to the polymer core material (or an intermediate layer), or may be laminated between the polymer core material and one or more other layers.

Stylus: refers to any device used to assist in assessing whether a security document, or security device associated with a security document, is legitimate and not counterfeit by virtue of its optical interference properties. The device typically comprises a pressure end or side having a surface suitable to apply mechanical pressure to the security device, and another end or side to which light is transmitted through the device from the pressure end or side. In this way the optical properties of the security device at one or more points of mechanical pressure can be seen or visualized (this contrasts to the application of pressure by for example an opaque block, where the colour of the surface of the device under pressure would be obscured by the material of the block). In simple embodiments the stylus may take the form of a piece of glass or clear plastic, such that application of pressure to a security device of the type described herein by one side of the glass or clear plastic can be seen through the glass or clear plastic from the other side thereof. In other embodiments the stylus may take the form and appearance of a pen-like device that can be hand held. Whenever the stylus takes an elongate appearance the stylus may include a pressure end for applying pressure to the security device and an observation end, wherein visual inspection of the observation end enables a user to determine the optical properties of the security device under pressure at the pressure end. For example, such a stylus may comprise means for transmitting light from the pressure end to the observation end, such as for example one to a plurality of bundled optical fibres.

Transmitted light: refers to light that is incident upon a surface, layer or multiple layers, of which a portion of the light is able to pass through and/or interact in some way with the surface, layer or layers by transmission. Light may be transmitted through a layer or layers by virtue of the layer or layers not being entirely opaque, but instead permitting at least a portion (e.g. 0-99%) of the incident light to be transmitted through the layer or layers in view of the layer or layers exhibiting at least some degree of translucency.

Window: refers to a region or portion of a security device in which a component of a security device, such as a security thread, is exposed for visual inspection, because there is little or no translucent or opaque material to obscure the view of the exposed portions. A window may be present even if there are transparent or translucent layers, for example of film, to cover the security device or components thereof, because the exposed portions of the security thread are still visible, at least in part, through the film. In further selected embodiments as disclosed herein 'window' refers to one or more portions of a security device as disclosed herein in which a masking layer does not extend across all of the surface of a security thread, such that portions of the security thread are exposed for visual inspection in reflective light.

DETAILED DESCRIPTION OF THE INVENTION

Herein described are optically variable devices and optical interference structures that, at least in selected embodiments, are useful as security features for security documents. The invention encompasses the structures themselves, as well as methods for their manufacture and use. To date, thin film colour-shifting optically variable foils have had limited use in the mass-production of security documents, in part due to their cost and speed of manufacture. The optically variable devices described herein help to address the limitations of the prior art.

Optical interference structures are well known for their colour-shift properties. These structures are capable of filtering the visible spectrum of light into one or more bands of relatively high reflectance bounded by bands of relatively low reflectance. In this way, optical interference structures exhibit a coloured appearance when illuminated with white light. Moreover, such structures may exhibit a colour-shift as they are tilted relative to the eye.

Some optical interference structures are capable of producing interference colours by employing multiple transparent or semitransparent layers to achieve the filtering effect. For example, some structures may comprise thin layers of dielectric material of alternating high and low refractive index, or alternating metal and dielectric layers, wherein the metal layers are semitransparent except for an opaque or reflective base layer. Other optical interference structures involve fewer layers but still achieve useful colour-shift characteristics. For example, Fabry-Perot optical cavities may comprise just a single reflector layer of a reflective material together with a single absorber layer of a translucent absorber material, wherein the reflector and absorber layers are spaced by a spacer layer having a high degree of optical transparency in the visible portion of the light spectrum. The resulting Fabry-Perot optical cavity exhibits colour-shifts dependent upon the optical properties of the reflector and absorber layers, as well as the thickness of the spacer layer between them.

The inventor has endeavoured to develop novel optical interference structures that are useful in the production of security documents. In particular, the inventor has endeavoured to develop security devices that exhibit colour-shift properties that can be altered or selectively activated according to the user manipulation of the device either by hand or with the assistance of a screening tool or device. To this end the security devices disclosed herein that include at least one layer of deformable material that can be deformed or otherwise squashed to reduce the thickness of the layer upon application to the material of a mechanical pressure or force. Such deformation enables the device to adopt alternative optical properties according to whether the deformable material is in a relaxed state under reduced mechanical pressure or absent mechanical pressure, or a compressed state under mechanical pressure or increased mechanical pressure.

Certain exemplary embodiments will now be described with reference to the accompanying figures. For simplicity, these will be described in terms of a relaxed state absent mechanical pressure, and a compressed state under mechanical pressure. However, no embodiment is limited in this regard any a transition between relaxed and compressed states may be achievable by altering the degree of mechanical pressure being applied to the device (rather than applying and removing the mechanical pressure). It should also be noted that the accompanying figures illustrate exemplary embodiments in a schematic fashion: the thickness of the layers shown relative to one another, or the relative thicknesses of the deformable spacer layers in a relaxed or compressed state, are not shown to scale but exaggerated from typical working embodiments to facilitate an understanding of certain aspects of the invention.

Turning first to FIG. 1 there is shown in FIG. 1a a top-plan view of a security document shown generally at 9, and in FIG. 1b there is shown a cross-section through the same security document along lines A-A' in FIG. 1a, with an optically variable device in direct contact with the core substrate of the document.

In FIG. 1 the core substrate 10 may comprise any suitable material or combination of materials, but in this example comprises a polymer such as PET having a thickness of about 12 µm. Attached to the PET is a security device shown generally at 11, comprising three distinct layers. A reflector layer 12 is in direct contact with the PET 10, and comprises any material with reflective properties for visible light incident upon the layer. In the example shown in FIG. 1 the reflective layer comprises a vacuum-deposited layer of Aluminum having a thickness of about 200 nm.

In contact with the reflector layer 12 is a deformable spacer layer 13 covering the reflector layer 12. In the embodiment shown in FIG. 1 the absorber layer 14 adhered to the deformable spacer layer comprises a metal alloy such as Inconel™ having a thickness of about 6 nm. The embodiment illustrated in FIG. 1 shows how the absorber layer 14 is spaced from the reflector layer 12 by deformable spacer layer 13.

FIG. 1b illustrates the device 11 upon substrate 10 in a relaxed state absent any mechanical force upon the device. In the relaxed state the thickness of the deformable spacer layer 13 as shown in the embodiment is about 400 nm to achieve a gold-green colour shift shown schematically by arrows 15. In contrast, FIG. 1c illustrates the same device 11 upon the same substrate 10, but with a mechanical force denoted by arrows 16 applied to the device to cause the deformable spacer layer to be deformed from the relaxed state, thereby to adopt a compressed state. In the compressed state the thickness of the deformable spacer layer 13 is less (e.g. 250 nm) than in the relaxed state shown in FIG. 1b. The compression is sufficient to disrupt the optical interference structure of the device such that the colour shift 15 shown in FIG. 1b is no longer observable by a user for the device.

Figure 2:
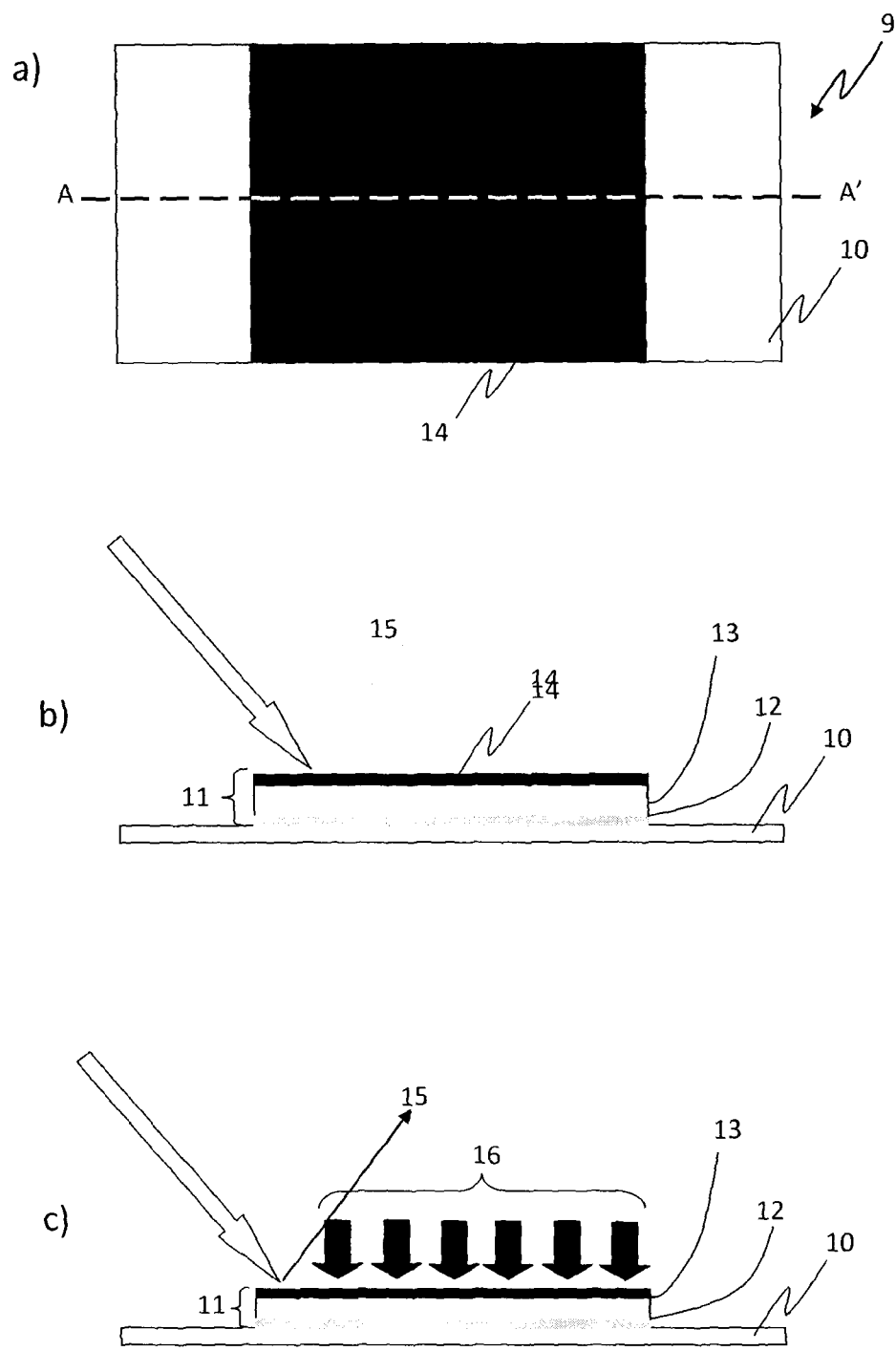

FIG. 2 illustrates an alternative embodiment similar to FIG. 1, but in which an optical interference structure is formed only upon application of a mechanical pressure to cause the device to adopt the compressed state. FIGS. 2a and 2b illustrate a device similar in appearance to that shown in FIGS. 1a and 1b, except that in a relaxed state absent any mechanical pressure the device does not provide a colour shift due to an absence of a functioning optical interference structure. This is due, at least in this example, to the device including a deformable spacer layer 13 having a thickness of 650 nm; too thick for a useful and observable colour shift. However, as shown in FIG. 2b, application of mechanical pressure denoted by arrows 16 causes deformation of the deformable spacer layer such that it is compressed to adopt a thickness of 400 nm in a compressed state. In this way, a functional optical interference structure is formed in the compressed state, giving rise to an observable green-gold colour shift 15 as shown in FIG. 2c.

Figure 3:
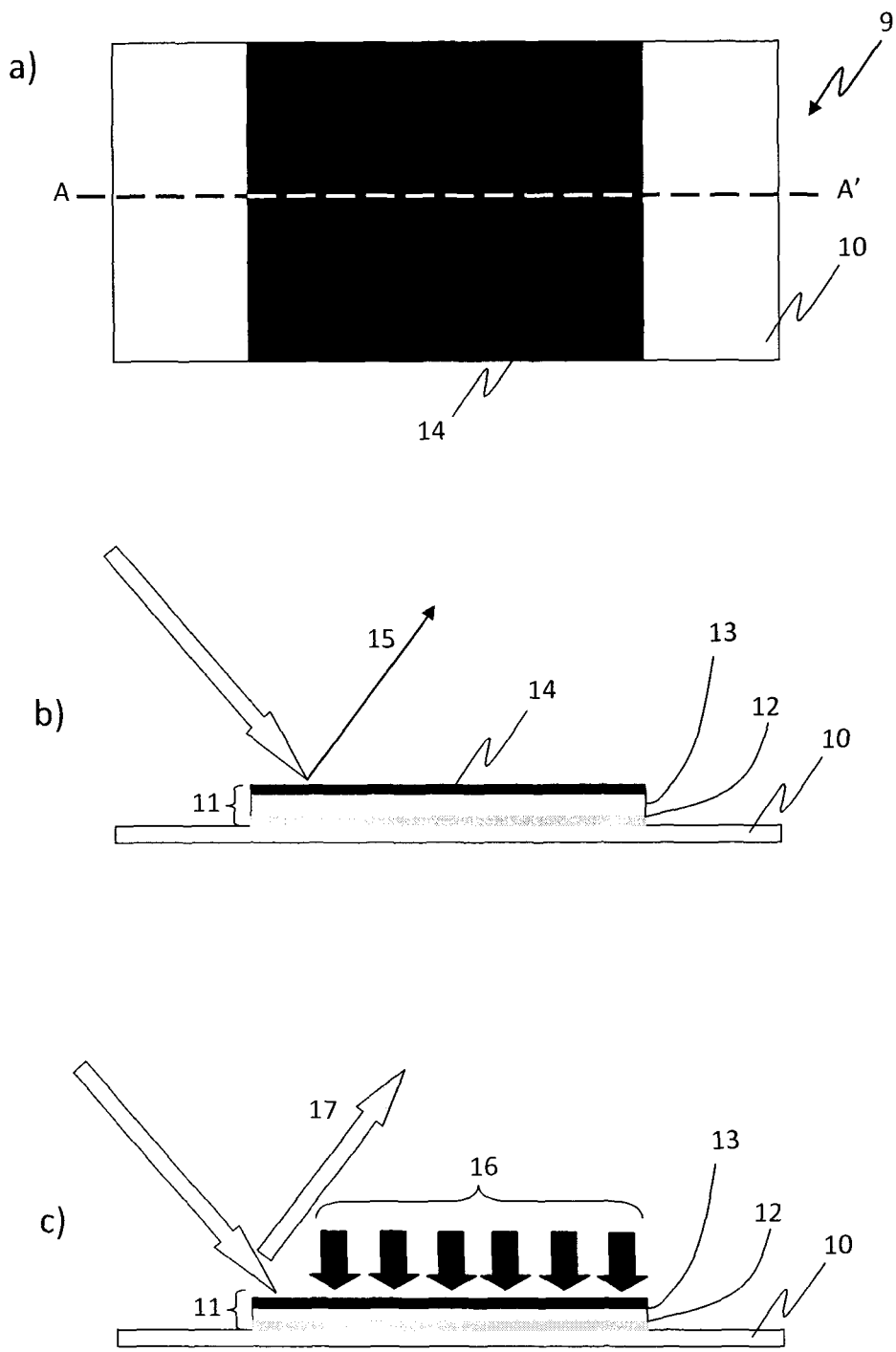

FIG. 3 illustrates an alternative embodiment to those shown in FIGS. 1 and 2, wherein a colour shift is observed in both a relaxed state absent any mechanical pressure (see FIG. 3b) and also in a compressed state in the presence of mechanical pressure denoted by arrows 16 in FIG. 3c. However, the colour shift in the relaxed state is a green-gold colour shift provided by virtue of the deformable spacer layer 13 having a thickness of 400 nm in a relaxed state (FIG. 3b) whereas use of a less deformable material for the deformable spacer layer, or use of less mechanical pressure, causes a smaller reduction in the thickness of the deformable spacer layer to 300 nm in a compressed state in FIG. 3c, such that a colour shift is still observable but the colour shift denoted by arrows 17 in FIG. 3c is blue-magenta instead of green-gold. Thus, transition of the device from a relaxed state to a compressed state (or vice verse) results in a change in the observable colour-shift properties for the device.

Figure 4:
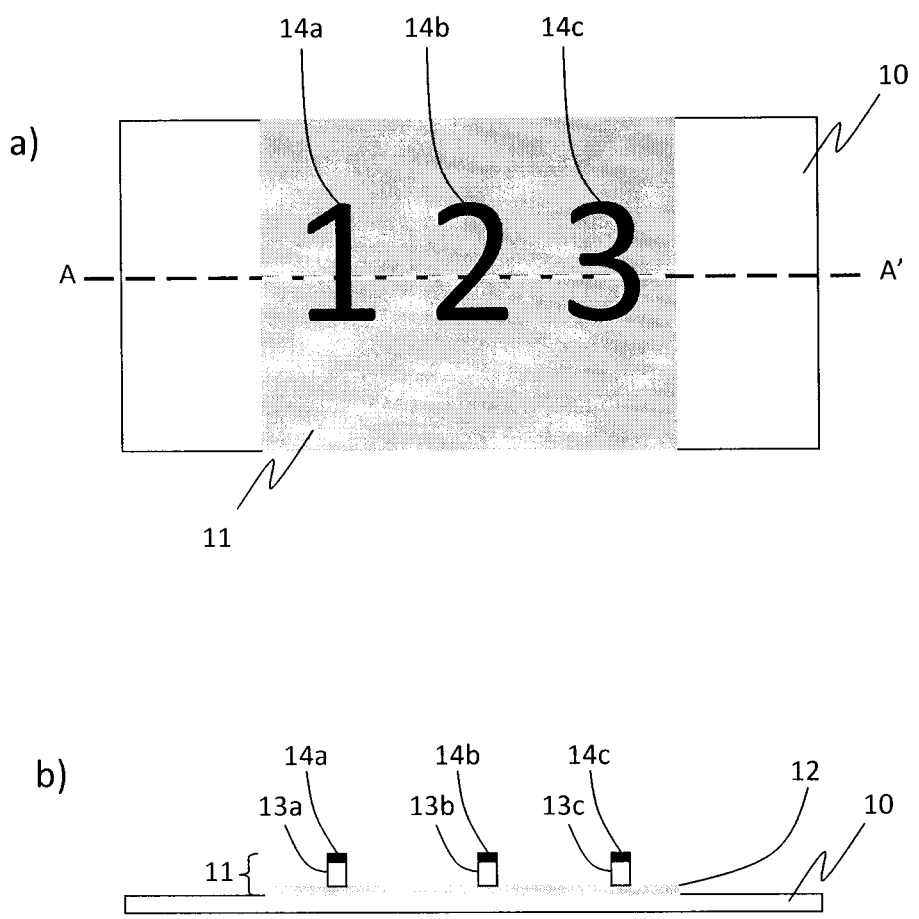
Figure 5:
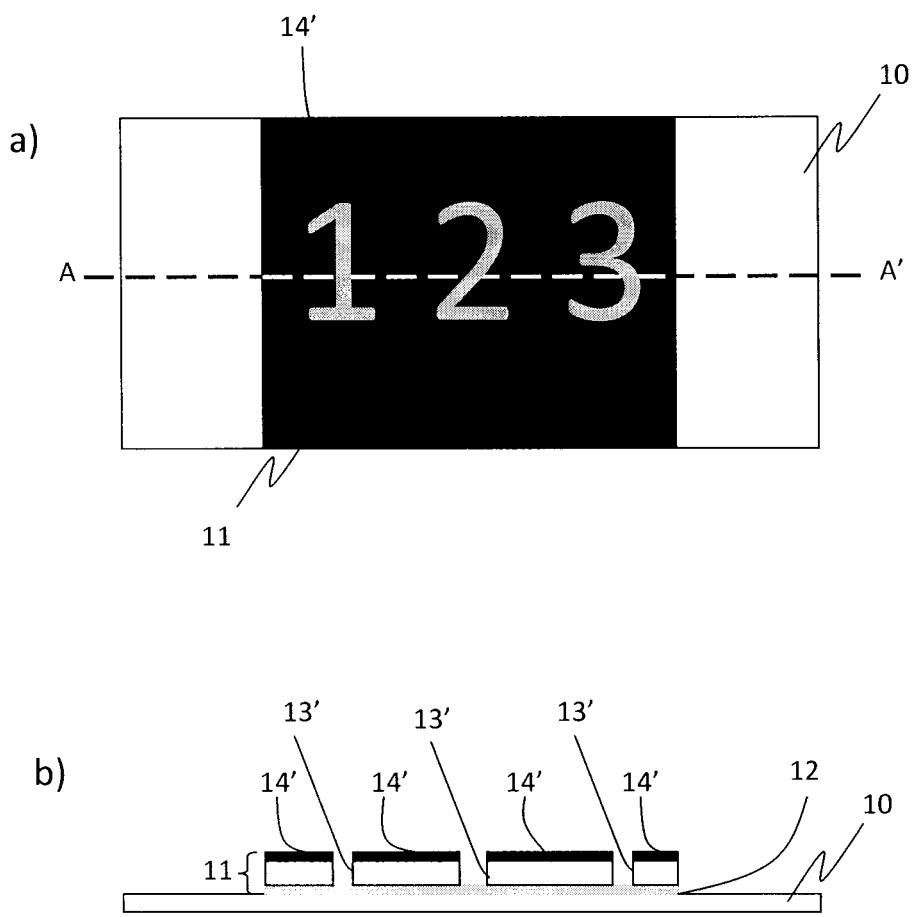
Figure 6:
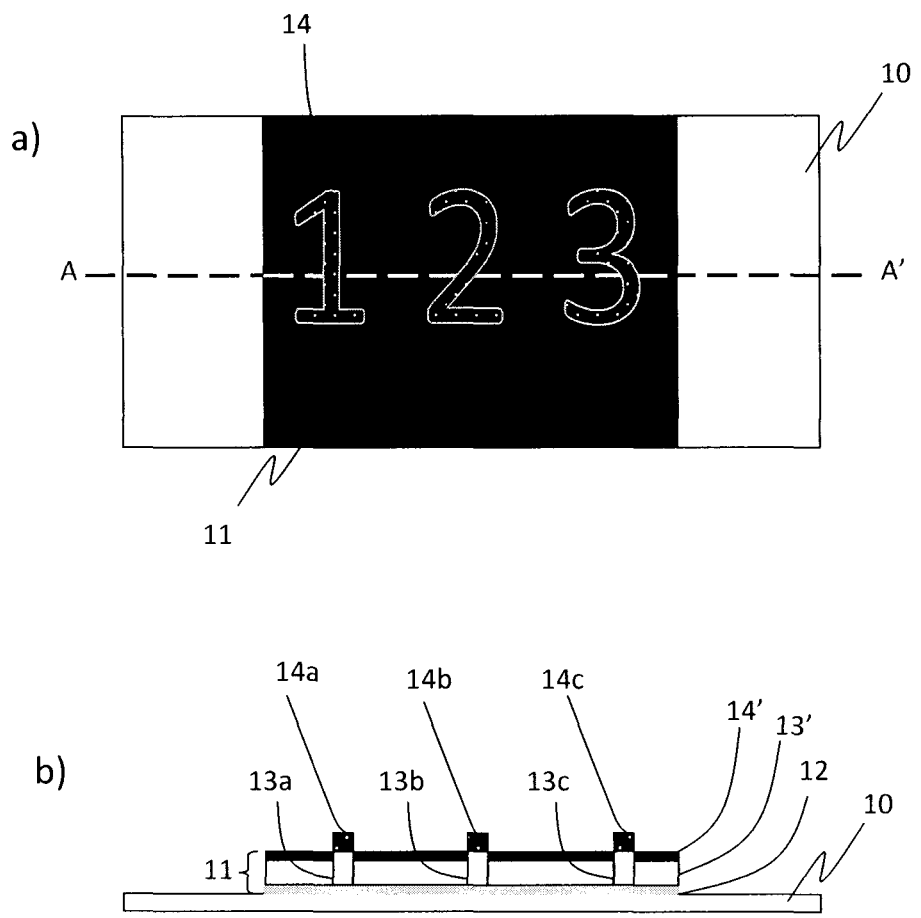

FIGS. 4 to 6 illustrate how content may be included in the security devices and optical interference structures disclosed herein. For example, in FIG. 4 there is shown a device 11 again comprising layers 12, 13, and 14 as for FIGS. 1 to 3, except that the optical cavity structure has only been completed in certain areas by deformable spacer layer 13a, 13b, 13b and absorber layer (e.g. Inconel) 14a, 14b, 14c. In contrast, FIG. 5 provides in effect a negative of the embodiment illustrated in FIG. 4, with deformable spacer layer 13' and absorber layer 14'. Such patterns may be achieved by the use of a deformable spacer layer material that is amenable to being printed upon reflector layer 12 such as by Gravure printing, or alternatively other techniques known in the art may be employed to produce such patterns, such as but not limited to vacuum deposition and wet etching techniques. If the deformable spacer layer is adhesive or tacky, then the layer may be contacted with absorber material, for example located via a release layer on a web, such that the absorber material adheres to the deformable spacer layer and is released from the web, thus to complete the optical interference structure. Regardless, the deformable spacer layer may have any deformation properties and thickness as required to achieve as desired loss, gain or change or colour shift properties as the device transitions between a relaxed and compressed state, as described with reference to FIGS. 1 to 3.

FIG. 6 illustrates an alternative security device shown generally at 11 including content in the form of numbers 1, 2 and 3 as shown in FIG. 6a. FIG. 6b illustrates a cross-section through the device along line A-A' in FIG. 6a. The portions of the optical interference structure that include numbers 1, 2, and 3 comprise a deformable spacer layer 13a, 13b, 13c that is thicker than the deformable spacer layer 13' of the remainder of the device. As a result, whether in a relaxed or compressed state, the numbers 1, 2 and 3 are visible by virtue of the alternative optical properties of the device provided by thicker deformable spacer layer 13a, 13b, 13c. For example, in a relaxed state the portion of the device comprising areas other than those forming number 1, 2, and 3 may comprise a deformable spacer layer 13' having a thickness of 400 nm to give rise to a green-gold colour shift, whereas in the relaxed state the portions comprising number 1, 2, and 3 may have a deformable spacer layer with a thickness of 650 nm: too thick to provide a functional optical interference structure. Upon application of mechanical pressure all deformable spacer layers present may be reduced in thickness by 250 nm. This would result in those areas around numbers 1, 2, and 3 having a deformable spacer layer of 150 nm: too thin to provide a functional optical interference structure, whereas the deformable spacer layer of the number 1, 2, and 3 may be reduced to 400 nm suitable to provide a gold-green colour-shift. Any variants to alter the optical properties of the various regions of the device in the relaxed and/or compressed state are encompassed by the invention.

In other embodiments only selected portions of the device may include a deformable spacer layer, whereas other portions may comprise any 'regular' non-deformable spacer layer. In such embodiments, the portions that include a regular spacer layer and the portions that include a deformable spacer layer may optionally have spacer layers having the same or near identical thicknesses either when the portions comprising a deformable spacer layer adopt a relaxed or compressed state. In this way the content may only become visible to a user upon application or removal of mechanical pressure, to transition select portions of the device to an alternative state (relaxed or compressed) suitable to provide a difference in the relative spacer layer thicknesses of the regions comprising the deformable spacer layer compared to the regions comprising the regular non-deformable spacer layer. For example with reference to FIG. 6a, the device may comprise numbers 1, 2 and 3 each having a regular non-deformable spacer layer, surrounded by other regions having a deformable spacer layer with the same thickness as the regular non-deformable spacer layer only when in one of the relaxed or compressed states. For example, application of mechanical pressure to the device may alter the thickness only of the deformable spacer layer present in the regions surrounding numbers 1, 2 and 3 with a resulting optical difference (gain, loss or change in colour-shift properties) compared to the regions comprising numbers 1, 2 and 3. If the mechanical pressure causes the regions surrounding numbers 1, 2 and 3 to lose reflectance properties compared to the numbers then this may result in the numbers 1, 2 and 3 becoming more obvious so that they 'appear' to a user upon visual inspection of the device when pressure is applied. In alternative embodiments, the numbers 1, 2 and 3 may be visible to a user only when the regions surrounding the numbers are in a relaxed state, due to a different thickness of the deformable spacer layer in the regions surrounding the numbers compared to the regions comprising the numbers, wherein the numbers may be caused to 'disappear' when a user applies pressure to the device to bring the regions comprising the deformable spacer layer into a compressed state, such that the thickness of the deformable spacer layer is then comparable to the thickness of the regular non-deformable spacer layer. Of course, it will be appreciated that further variants of such embodiments may be used, including use of a deformable spacer layer in the regions of the device forming the numbers, with a regular non-deformable spacer layer in the other regions of the device.

Different thicknesses of the deformable spacer layer may be produced for example by a single Gravure printing step using a template with varying thicknesses of deformable material, or by multiple rounds of Gravure printing of the deformable spacer layer, either with a single or multiple rounds of absorber layer application each deformable spacer layer having a different thickness to produce a different optical interference structure when the absorber layer is added. The invention is not limited in this regard, and any means to generate any form of security device or optical interference structure, with any type of content, is included within the scope of the invention, providing the device or structure includes at least portion comprising a deformable spacer layer giving rise to a change in colour shift properties upon application of, or increase in, mechanical pressure applied to the device.

Optionally, each deformable spacer layer may comprise an alternative refractive index caused not only by a thickness of each layer, but optionally by the presence of other components in the layer, such as but not limited to nanoparticles etc. This applies regardless of whether the device pertains to a multilayer stack, a Fabry-Perot structure, or other optical interference structure. Moreover, the optical properties of a deformable spacer layer, such as refractive index, can be adjusted as required by altering the chemical composition of the deformable spacer layer. The moieties composing the deformable spacer layer can be altered or high refractive index nanoparticles may optionally be added to the deformable material to alter the refractive index and other properties of the deformable spacer layer. High index nanoparticles include but are not limited to zirconium dioxide ($ZrO_2$), titantium dioxide ($TiO_2$), hafinium oxide (HfO) and niobium pentoxide $Nb_2O_5$).

UV fluorescent dyes and pigments can also be incorporated into the deformable spacer layer such that when the layer is exposed to a UV light source of appropriate wavelength the lamp's spectral output overlaps with the optical absorption profile of the fluorescent dye. Common document security UV lamps have outputs with peak emissions at 365 nm. Fluorescent dyes and pigments may be selected that can be dispersed or dissolved in the deformable spacer layer. The completed Fabry-Perot cavity colour-shift feature may thus exhibit an angle dependant colour-shift in the observed fluorescent emission depending upon the optical properties of the cavity and fluorescent emission spectrum of dye(s), pigment(s) or combinations of fluorescent materials dispersed or dissolved in the deformable spacer layer. In other embodiments emission intensity of the fluorescent emitter in the spacer cavity may vary with a change in viewing angle such that little or no colour-shift is observed.

Optionally the devices disclosed herein comprise a reflector layer comprising a metallic layer, preferably selected from a metal, a metal alloy, aluminum, chromium, nickel, Inconel, silver, and gold. Optionally the reflector layer reflects from 1-100% of light incident thereupon.

Optionally the devices disclosed herein comprise a deformable spacer layer comprising at least one adhesive material selected from acrylated urethanes, methacrylate esters, mercapto-esters and a UV curable adhesives.

Optionally the devices disclosed herein comprise an absorber layer comprising at least one material selected from the group consisting of Inconel, chromium, aluminum, silver and nickel. Optionally the absorber layer permits transmission therethrough of from 1-99% of light incident thereupon.

The optical interference structures and corresponding security devices may comprise at least one deformable spacer layer that can be permanently or temporarily deformed to produce an observable change in the optical properties of the device. Preferably, the change can be repeated on several, or many occasions by virtue of the temporary and repeatable deformability of the layer. This in turn required the layer to comprise a material that can be repeatedly transitioned or cycled between relaxed and compressed states. Most materials suitable for this application may be compressed relatively quickly so the optical change can be observed without delay. However, consideration must also be given to the relaxation time for the layer; that being the time it takes for the layer to transition back to the relaxed state from the compressed state after removal of a compressive force or pressure. The invention encompasses the use of any deformable material giving rise to any relation time, although a relaxation time of from 0.1 to 60 seconds would be desired, with a degree of relaxation close to 100% compared to a previous relaxed state. This would allow a user or scanning tool to repeatedly check the legitimacy of a document without having to wait very long before another check can be made. The deformability of the deformable spacer layer, and the degree of pressure required to cause deformation and transition from a relaxed to a compressed state, may be adjusted according to the materials used. Furthermore, the deformable spacer layer may optionally includes a plurality of pores or voids that reduce in volume when mechanical pressure is applied to the device thereby to assist compression of the spacer layer from a relaxed state to a compressed state.

Further exemplary embodiments encompass a use of any optically variable device or optical interference structure as herein described, as a security feature of a security document.

Further exemplary embodiments provide for a security document comprising:
  a core material; and
  at least one optically variable device or optical interference structure as herein described, affixed to at least one side of the core material, or at least partially embedded into the core material, such that the device is at least partly visible in reflected light from said at least one side. The core material may comprise any material suitable for the production of a security document, but in selected embodiments may comprise at least one material selected from the group consisting of: paper, polymer, and plastic, and combinations or hybrids thereof.

The optically variable device of the invention may be incorporated onto or into the core material of the security document via any appropriate means, and may take any form or shape suitable for the document. For example, the device may take the form of a security thread either laminated or adhered into position upon the core material or the security document, or woven into the core material in a manner well known in the art. The device may be entirely visible on the security document, or may be only partially visible through 'windows' formed either by the threading of the device through the core material or the security document, or by masking of select portions of the device by way of a masking material.

Optionally, the security document may further comprise a portion to be pressed against the optically variable device, thereby to cause a change in the visible appearance of the device. For example, the document may be folded over to align the portion so that it can be pressed against the security device, thereby to alter a thickness of the deformable spacer layer to cause a change in the visible appearance of the device. Optionally, the portion to be pressed against the optically variable device comprises intaglio printing, thereby to provide a raised, optionally patterned, region as a pressure template to achieve the change in visible appearance of the device. In this way, the raised, printed portions may exert increased pressure upon the security device compared to adjacent unraised portions, thereby to achieve a desired pattern of mechanical pressure upon the security device, and a resulting pattern of optical variation in the device. Alternatively, the portion to be pressed against the optically variable device may comprise simply a transparent or translucent window in the document, such that folding of the document and alignment of the window with the device, followed by mechanical pressure by the window on the device, causes a change in the appearance of the security device visible through the window.

Figure 7:
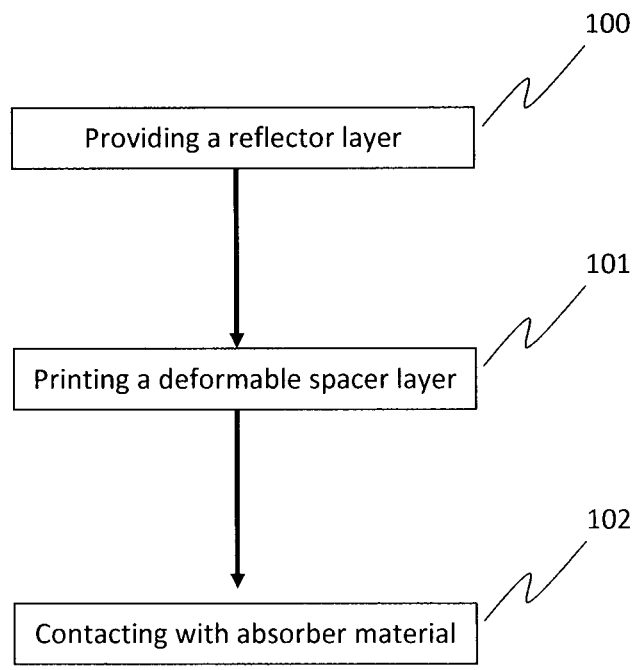
FIG. 7 illustrates a method for producing an optically variable device.

Further exemplary embodiments relating to FIG. 7 provide for a method for producing an optically variable device, the method comprising:
  in step 100 providing a reflector layer;
  in step 101 printing a deformable spacer layer upon preselected portions of the reflector layer, wherein said deformable spacer layer comprises an adhesive material; and
  in step 102 contacting the deformable spacer layer with absorber material coated on a web, to cause release of the absorber material from the web and adhesion of the absorber material to the deformable spacer layer where present, thereby to complete an optical interference structure over said preselected portions of the reflector layer.

Optionally, the absorber layer (e.g. Inconel) may for example be applied to the deformable spacer layer by vacuum deposition or by transfer from a release coated web containing vacuum deposited Inconel of the correct thickness applied thereto in separate vacuum deposition process.

Optionally step 101 of printing comprises Gravure printing.

Optionally step 102 of contacting comprises pressing the coated web and deformable spacer layer together using a roller.

Optionally in step 101 the deformable spacer layer comprises a UV curable material, the method further comprising the step of:

curing the deformable spacer layer with UV radiation.

Optionally, in step 102 the printed deformable spacer layer is printed with a non-uniform thickness in a relaxed state and/or in a compressed state, thereby to provide different regions of the device with different optical properties in the relaxed state and/or in the compressed state.

Alternatively, at least one further deformable spacer layer is applied to the reflector layer prior to the step of contacting, the deformable spacer layers covering different parts of the reflector layer, each having different thicknesses relative to one another in the relaxed and/or compressed states, such that the step of contacting completes alternative optical interference structures with alternative optical colour-shift properties for each deformable spacer layer.

Alternatively, the steps of printing and contacting are repeated at least once to produce two or more optical interference structures, a further deformable spacer layer being applied to the reflective layer upon each step of printing, each optical interference structure being formed upon said further step of contacting, each deformable spacer layer optionally having an alternative thickness to other deformable spacer layers present in the relaxed and/or compressed states, such that each optical interference structure thus produced exhibits alternative colour-shift properties to the other optical interference structures forming part of the device.

In the methods of FIG. 7 and related embodiments described herein, the methods have been described with the reflector layer as the starting layer, with the deformable spacer layer printed on the reflector layer, and the absorber layer applied in some way to the adhesive spacer layer. It is important to note that in any of the embodiments described herein, the process may be effectively reversed. In other words, the starting layer may be the absorber layer, such that the method comprises the steps of:

providing an absorber layer;

printing a deformable spacer layer upon preselected portions of the absorber layer; and contacting the deformable spacer layer with reflector material to form a reflector layer on the deformable spacer layer to complete an optical interference structure over said preselected portions of the absorber layer. It follows that any of the optional or preferred features of the methods herein described may be applied to this alternative method. For example, the reflector layer may be formed from a web coated with reflector material with a release layer between the reflector material and the web, such that contacting the deformable spacer layer with the reflector material causes release of the reflector material from the web and completion of an optical interference structure. Any of the embodiments described above may be applied to such methods, without limitation.

Figure 8:
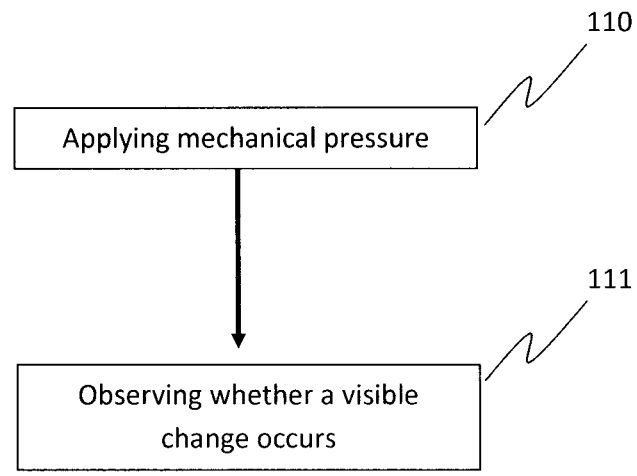
FIG. 8 illustrates a method for checking the legitimacy of a security document.

Further exemplary embodiments are illustrated in FIG. 8, which provides for a method for checking whether a security document is a legitimate or counterfeit document, the security document comprising at least one optically variable device as described herein visible on at least one side thereof, the method comprising the steps of:

in step 110 applying mechanical pressure to at least one optically variable device; and in step 111 observing whether the mechanical pressure causes a visible change in the appearance of the optically variable device, wherein any visible change is indicative that the security document is a legitimate document.

Optionally in step 111 the observing comprises visual inspection of the optically variable device upon application and/or removal of the mechanical pressure.

Optionally in step 110 the applying comprises pressing the optically variable device with a stylus comprising a pressure end for applying pressure to the device, an observation end for observing optical properties of the device, and light transfer means to transfer light from at or near a surface of the device at the pressure end to the observation end, and wherein the step of observing comprises inspecting light emitted from the observation end when the pressure is applied to the device by the pressure end of the stylus. Optionally the light transfer means of the stylus comprises from one to a plurality of optic fibres.

Optionally in step 110 the step of applying comprises pressing a portion of the security document against the optically variable device. Optionally, the portion of the security device may comprise intaglio printing as a pressure template for said mechanical pressure. Alternatively, the portion may comprise a transparent or translucent window in the document so that a change in the appearance of the security device may be observed through the window as said mechanical pressure is being applied. All of the variants and embodiments described as optional or preferred features of the method shown in FIG. 7 are also applicable to the method illustrated and described with reference to FIG. 8.

Whilst various embodiments of security devices, security documents, as well as methods for their production and use, are described and illustrated herein, the scope of the appended claims is not limited to such embodiments, and the invention encompasses further embodiments readily obtainable in view the teachings presented herein.

The invention claimed is:

1. An optically variable device comprising: a reflector layer; a deformable spacer layer covering part or all of the reflector layer, said deformable spacer layer deformable from a relaxed state to a compressed state upon application of, or an increase of, a mechanical pressure upon the deformable spacer layer, wherein the deformable spacer layer is applied to the reflector layer under atmospheric conditions, wherein the deformable spacer layer is deformable in thickness by at least 100 nanometers from the relaxed state, and wherein the deformable space layer is reversibly deformable to adopt said relaxed state absent the mechanical pressure upon the deformable spacer layer; and an absorber layer covering the deformable spacer layer, where present, so that the deformable spacer layer spaces the absorber layer from the reflector layer to form a Fabry-Perot optical cavity in at least one of said relaxed and compressed states, and wherein a transition of the deformable spacer layer between said relaxed and compressed states causes a change in at least one of an observed colour or a colour-shift property of at least a portion of the optically variable device.

2. The optically variable device of claim 1, wherein the layers together in at least a portion of the optically variable device form the Fabry-Perot optical cavity in both said relaxed state and in said compressed state.

3. The optically variable device of claim 1, wherein the layers of least a portion of the optically variable device together form the Fabry-Perot optical cavity only in said relaxed state, such that transition to said compressed state disrupts said Fabry-Perot optical cavity resulting in a change, reduction or loss of colour in at least a portion of the optically variable device.

4. The optically variable device of claim 1, wherein the layers of least a portion of the optically variable device together form the Fabry-Perot optical cavity only in said compressed state, such that transition to said relaxed state disrupts said Fabry-Perot optical cavity resulting in a change, reduction or loss of colour in at least a portion of the optically variable device.

5. The optically variable device of claim 1, wherein the reflector layer comprises a metallic layer, preferably selected from a metal, a metal alloy, aluminum, chromium, nickel, Inconel, silver, and gold.

6. The optically variable device of claim 1, wherein the reflector layer reflects from 1-100% of light incident thereupon.

7. The optically variable device of claim 1, wherein the deformable spacer layer comprises at least one adhesive material selected from acrylated urethanes, methacrylate esters, mercapto-esters and a UV curable adhesives.

8. The optically variable device of claim 1, wherein the absorber layer comprises at least one material selected from the group consisting of Inconel, chromium, aluminum, silver and nickel.

9. The optically variable device of claim 1, wherein the absorber layer permits transmission therethrough of from 1-99% of light incident thereupon.

10. The optically variable device of claim 1, wherein the deformable spacer layer is formed on said reflector layer by Gravure printing.

11. The optically variable device of claim 1, wherein upon removal of mechanical pressure, the deformable spacer layer of said optically variable device relaxes from said compressed state to said relaxed state in a time of from 0.01 to 60 seconds.

12. The optically variable device of claim 1, wherein the deformable spacer layer has a non-uniform thickness when in said relaxed and/or said compressed state, such that different parts of the deformable spacer layer exhibit different colour-shift properties.

13. The optically variable device of claim 1, wherein the deformable spacer layer includes a plurality of pores or voids that reduce in volume when mechanical pressure is applied to the optically variable device thereby to assist compression of said deformable spacer layer from said relaxed state to said compressed state.

14. Use of an optically variable device of claim 1, as a security feature of a security document.

15. A security document comprising:
a core material; and
at least one optically variable device of claim 1 affixed to at least one side of the core material, or at least partially embedded into the core material, such that the at least one optically variable device is at least partly visible in reflected light from said at least one side.

16. The security document of claim 15, wherein the core material comprises at least one material selected from the group consisting of: paper, polymer, plastic, and combinations or hybrids thereof.

17. The security document of claim 15, wherein the document further comprises a portion to be pressed against the at least one optically variable device, thereby to cause a change in the visible appearance of the at least one optically variable device.

18. The security document of claim 17, wherein the portion to be pressed against the at least one optically variable device comprises intaglio printing, thereby to provide a raised, optionally patterned, region as a pressure template to achieve the change in visible appearance of the at least one optically variable device.

19. The security document of claim 17, wherein the portion to be pressed against the at least one optically variable device comprises a transparent or translucent window in the document, such that any change in the visible appearance of the at least one optically variable device can be observed through the window as the mechanical pressure is applied.

20. A method for producing an optically variable device, the method comprising the steps of: providing a reflector layer; printing a deformable spacer layer upon preselected portions of the reflector layer, wherein said deformable spacer layer comprises an adhesive material, wherein the deformable spacer layer is applied to the reflector layer under atmospheric conditions, wherein the deformable spacer layer is deformable in thickness by at least 100 nanometers from a relaxed state, and wherein the deformable space layer is reversibly deformable to adopt said relaxed state absent a mechanical pressure upon the deformable spacer layer; and contacting the deformable spacer layer with absorber material coated on a web, to cause release of the absorber material from the web and adhesion of the absorber material to the deformable spacer layer where present, thereby to complete a Fabry-Perot optical cavity over said preselected portions of the reflector layer.

21. The method of claim 20, wherein the step of printing comprises Gravure printing.

22. The method of claim 20, wherein the step of contacting comprises pressing the coated web and deformable spacer layer together using a roller.

23. The method of claim 20, wherein the deformable spacer layer comprises a UV curable material, the method further comprising the step of:
curing the deformable spacer layer with UV radiation.

24. The method of claim 20, wherein the printed deformable spacer layer is printed with a non-uniform thickness in said relaxed state and/or in said compressed state, thereby to provide different regions of the optically variable device with different optical properties in said relaxed state and/or in said compressed state.

25. The method of claim 20, wherein at least one further deformable spacer layer is applied to the reflector layer prior to the step of contacting, the deformable spacer layers covering different parts of the reflector layer, each having different thicknesses relative to one another in said relaxed and/or compressed states, such that the step of contacting completes alternative optical interference structures with alternative optical colour-shift properties for each deformable spacer layer.

26. The method of claim 20, wherein the steps of printing and contacting are repeated at least once to produce two or more Fabry-Perot optical cavities, a further deformable spacer layer being applied to the reflective layer upon each step of printing, each Fabry-Perot optical cavity being formed upon said further step of contacting, each deformable spacer layer optionally having an alternative thickness to other deformable spacer layers present in said relaxed and/or compressed states, such that each Fabry-Perot optical cavity thus produced exhibits alternative colour-shift properties to the other Fabry-Perot optical cavities forming part of the device.

\* \* \* \* \*